US011138493B2

(12) United States Patent
Imaino et al.

(10) Patent No.: US 11,138,493 B2
(45) Date of Patent: Oct. 5, 2021

(54) APPROACHING HOMEOSTASIS IN A BINARY NEURAL NETWORK

(71) Applicant: INTERNATIONAL BUSINESS MACHINES CORPORATION, Armonk, NY (US)

(72) Inventors: Wayne I. Imaino, San Jose, CA (US); Ahmet S. Ozcan, San Jose, CA (US); J. Campbell Scott, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 942 days.

(21) Appl. No.: 15/853,280

(22) Filed: Dec. 22, 2017

(65) Prior Publication Data

US 2019/0197390 A1 Jun. 27, 2019

(51) Int. Cl.
*G06N 3/02* (2006.01)
*G06N 3/06* (2006.01)
(Continued)

(52) U.S. Cl.
CPC ............. *G06N 3/049* (2013.01); *G06N 3/082* (2013.01); *G06N 3/088* (2013.01); *G06N 3/0454* (2013.01); *G06N 3/063* (2013.01)

(58) Field of Classification Search
CPC ........ G06N 3/049; G06N 3/082; G06N 3/088; G06N 3/0454; G06N 3/063
(Continued)

(56) References Cited

U.S. PATENT DOCUMENTS 5,150,450 A * 9/1992 Swenson .................. G06N 3/08 706/25
7,430,546 B1 9/2008 Suri
(Continued)

FOREIGN PATENT DOCUMENTS

WO 199016038 12/1990
WO 2013070612 A1 5/2013
WO 2015020802 A3 5/2015

OTHER PUBLICATIONS

Hawkins et al., "Why Neurons Have Thousands of Synapses, A Theory of Sequence Memory in Neocortex," Front Neural Circuits, Retrieved from the Internet: URL:https://arxiv.org/ftp/arxiv/papers/1511/1511.00083.pdf [retrieved on Feb. 14, 2019].
(Continued)

*Primary Examiner* — Ly D Pham
(74) *Attorney, Agent, or Firm* — Erik Huestis; Stephen Kenny; Foley Hoag LLP

(57) ABSTRACT

Homeostasis-maintaining binary neural networks such as hierarchical temporal memories are provided. In various embodiments, a region of an artificial neural network is initialized. The region comprises a plurality of neurons and has a permanence value associated with each potential synaptic connection between neurons. The initialization comprises connecting a subset of the potential synaptic connections by synapses. A plurality of time-ordered inputs to the region is received. Some of the plurality of neurons are thereby caused to fire upon receipt of each time-ordered input. Upon receipt of each time-ordered input, for each potential synaptic connection between neurons, the permanence value is adjusted according to a firing sequence of the plurality of neurons. Those potential synaptic connections having a permanence value above a predetermined permanence threshold are connected when the total number of connected synapses in the region does not exceed a prede-
(Continued)

300 termined connectivity threshold. Synapses whose associated pre-synaptic neuron or post-synaptic neuron have more than a predetermined number of connected synapses are disconnected.

27 Claims, 7 Drawing Sheets

(51) Int. Cl.

| | |
|---|---|
| ***G11C 5/06*** | (2006.01) |
| ***G11C 7/10*** | (2006.01) |
| ***G06N 3/04*** | (2006.01) |
| ***G06N 3/063*** | (2006.01) |
| ***G06N 3/08*** | (2006.01) |

(58) Field of Classification Search
USPC ........................................................... 706/43
See application file for complete search history.

(56) References Cited

U.S. PATENT DOCUMENTS

| | | | | |
|---|---|---|---|---|
| 2010/0312735 | A1 | 12/2010 | Knoblauch | |
| 2010/0312736 | A1 | 12/2010 | Kello | |
| 2011/0047110 | A1 | 2/2011 | Rinkus | |
| 2011/0225108 | A1 | 9/2011 | Hawkins et al. | |
| 2015/0106316 | A1 | 4/2015 | Birdwell et al. | |
| 2015/0294217 | A1 | 10/2015 | Aparicio, IV | |
| 2017/0286846 | A1 | 10/2017 | Hawkins et al. | |
| 2019/0065935 | A1 * | 2/2019 | Ozcan | G06N 3/049 |
| 2019/0065955 | A1 * | 2/2019 | Ozcan | G06N 3/082 |
| 2019/0095211 | A1 * | 3/2019 | Imaino | G06F 9/38 |

OTHER PUBLICATIONS

International Search Report and Written Opinion for International Application No. PCT/EP2018/084293 dated Feb. 22, 2019.

Leake et al., "Effect of Spatial Pooler Initialization on Column Activity in Hierarchical Temporal Memory," Analog Integrated Circuits and Signal Processing, (2015).

Rybarsch, Matthias, et al; "Self-organized criticality in neural network models." arXiv preprint arXiv:1212.3106 (2012).

Diekelmann et al.; "The memory function of sleep." Feb. 2010, Nature Reviews vol. 11.

Bienenstock et al. "Theory for the Development of Neuron Selectivity: Orientation Specificity and Binocular Interaction in Visual Cortex," The Journal of Neuroscience, vol. 2, No. 1, pp. 32-48, Jan. 1982.

* cited by examiner

APPROACHING HOMEOSTASIS IN A BINARY NEURAL NETWORK

This invention was made with Government support under contract number N66001-15-C-4034 awarded by the Defense Advanced Research Projects Agency (DARPA) and the Space and Naval Warfare Systems Center Pacific (SSC Pacific). The Government has certain rights to this invention.

BACKGROUND

Embodiments of the present disclosure relate to artificial neural networks, and more specifically, to approaching homeostasis in binary neural networks such as hierarchical temporal memories.

BRIEF SUMMARY

According to embodiments of the present disclosure, methods of, and computer program products for, operating an artificial neural network are provided. In various embodiments, a region of an artificial neural network is initialized. The region comprises a plurality of neurons and has a permanence value associated with each potential synaptic connection between neurons. The initialization comprises connecting a subset of the potential synaptic connections by synapses. A plurality of time-ordered inputs to the region is received. Some of the plurality of neurons are thereby caused to fire upon receipt of each time-ordered input. Upon receipt of each time-ordered input, for each potential synaptic connection between neurons, the permanence value is adjusted according to a firing sequence of the plurality of neurons. Those potential synaptic connections having a permanence value above a predetermined permanence threshold are connected when the total number of connected synapses in the region does not exceed a predetermined connectivity threshold. Synapses whose associated pre-synaptic neuron or post-synaptic neuron have more than a predetermined number of connected synapses are disconnected.

According to additional embodiments of the present disclosure, an artificial neural network is provided. The neural network comprises a region comprising a plurality of neurons and having a permanence value associated with each potential synaptic connection between neurons. The network is initialized by connecting a subset of the potential synaptic connections by synapses. A plurality of time-ordered inputs to the region is received. Some of the plurality of neurons are thereby caused to fire upon receipt of each time-ordered input. Upon receipt of each time-ordered input, for each potential synaptic connection between neurons, the permanence value is adjusted according to a firing sequence of the plurality of neurons. Those potential synaptic connection having a permanence value above a predetermined permanence threshold are connected when a total number of connected synapses in the region does not exceed a predetermined connectivity threshold. Synapses whose associated pre-synaptic neuron or post-synaptic neuron have more than a predetermined number of connected synapses are disconnected.

According to embodiments of the present disclosure, methods of, and computer program products for, operating an artificial neural network are provided. In various embodiments, a plurality of time-ordered inputs are received to an artificial neural network, thereby causing a plurality of neurons of the artificial neural network to fire upon receipt of each time-ordered input. Upon receipt of each time-ordered input, for each potential synaptic connection between neurons of the artificial neural network, a permanence value associated with each potential synaptic connection between neurons that fire in sequence is increased and a permanence value associated with each potential synaptic connection between neurons that do not fire in sequence is decreased. Those potential synaptic connections having a permanence value above a predetermined permanence threshold are connected when the total number of connected synapses does not exceed a predetermined connectivity threshold. Synaptic connections whose associated neurons have more than a predetermined number of synaptic connections are disconnected.

DETAILED DESCRIPTION

Artificial neural networks (ANNs) are distributed computing systems, which consist of a number of neurons interconnected through connection points called synapses. Each synapse encodes the strength of the connection between the output of one neuron and the input of another. The output of each neuron is determined by the aggregate input received from other neurons that are connected to it. Thus, the output of a given neuron is based on the outputs of connected neurons and the strength of the connections as determined by the synaptic weights. An ANN is generally trained to solve a specific problem (e.g., pattern recognition) by adjusting the weights of the synapses such that a particular class of inputs produces a desired output.

Artificial neural networks (ANNs) have been increasingly successful in addressing problems in artificial intelligence, particularly those that require large amounts of data and long times to process, such as images and documents. They are useful in machine learning and artificial intelligence. As described above, the basic operation of each node or neuron in the network is to compute the weighted sum of inputs from other nodes, and if that sum exceeds a given threshold to fire, the neuron is activated. Weights are associated with the synaptic connections between each pair of neurons.

Current artificial neural networks predefine the connections between their nodes (or neurons), and operate by adjusting the strengths or weights of these connections (or synapses). Most do not allow for the creation of new synapses, nor the removal of synapses whose weight reaches zero. Hierarchical Temporal Memories (HTM) are binary networks that allow for the connection of new synapses and for removal of some inactive ones. However, learning rules on HTMs grow the network without any limit, consuming computational resources for elements that are no longer needed.

To address these and other limitations of alternative approaches, the present disclosure provides for artificial neural networks that tend towards an equilibrium between new synapse formation (synaptogenesis) and active removal (pruning) of unnecessary synapses. Thus, neural networks are provided that grow as they learn but that include mechanisms to control and limit that growth. The result is that the neural network code runs faster, with lower power consumption, and thus less heat. In hardware implementations of neural networks, the result is a minimization of physical space required. Computing resources that are no longer needed may be made available for more extensive future learning tasks.

Figure 1:
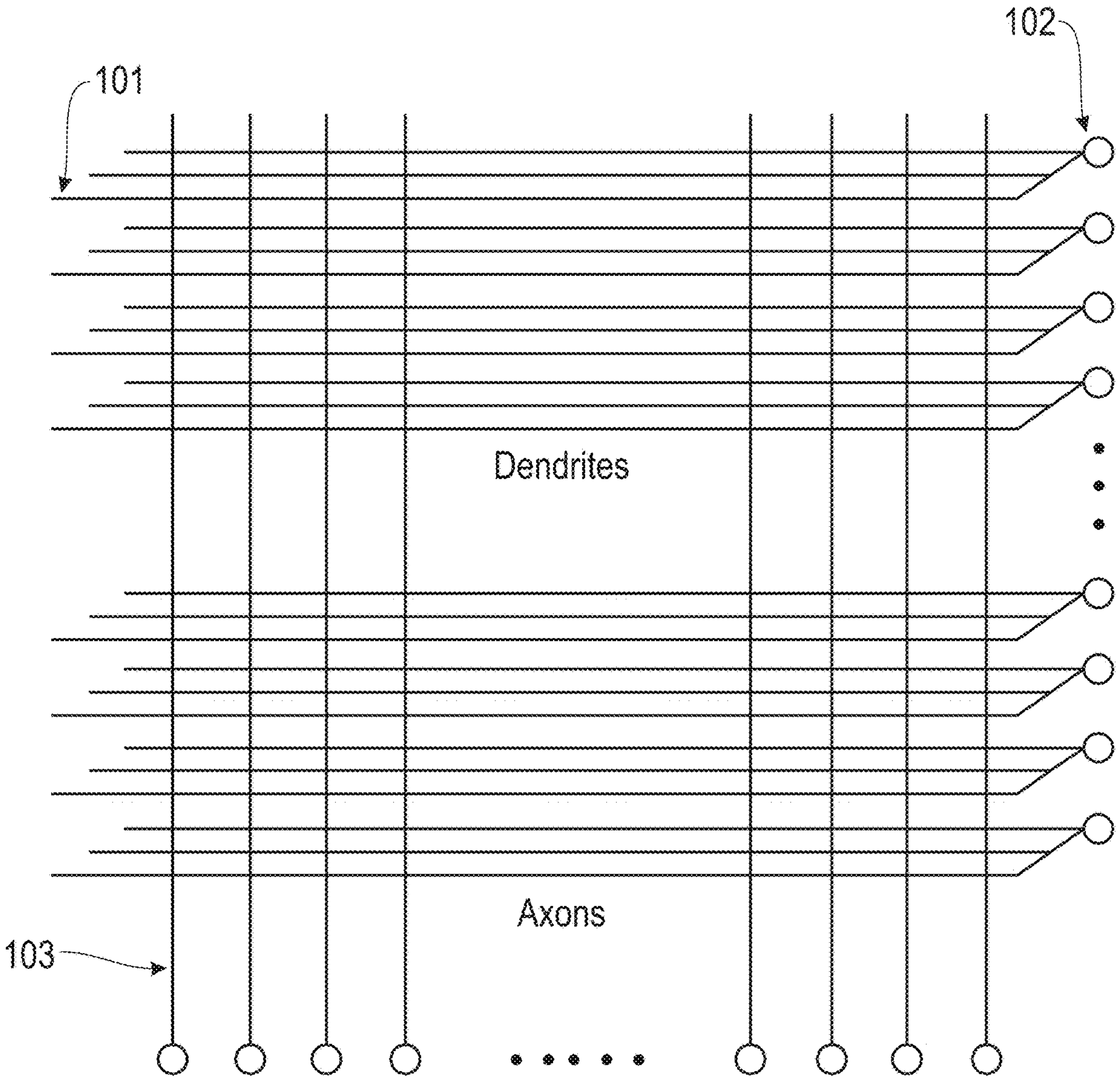
FIG. 1 illustrates an exemplary synapse array according to embodiments of the present disclosure.

Referring to FIG. 1, an exemplary synapse array is illustrated. The dendrites (horizontal lines 101), having 3 segments per neuron (circles 102), potentially form synaptic connections with the axons (vertical lines 103). In a pooler/correlator, e.g., of an HTM, the axons derive from neurons in regions lower in the hierarchy. In sequence memory, the axons come from the same set of cells as the inputs, i.e., the connections are lateral. For feedback, the axons derive from neurons in regions higher in the hierarchy.

Figure 2:
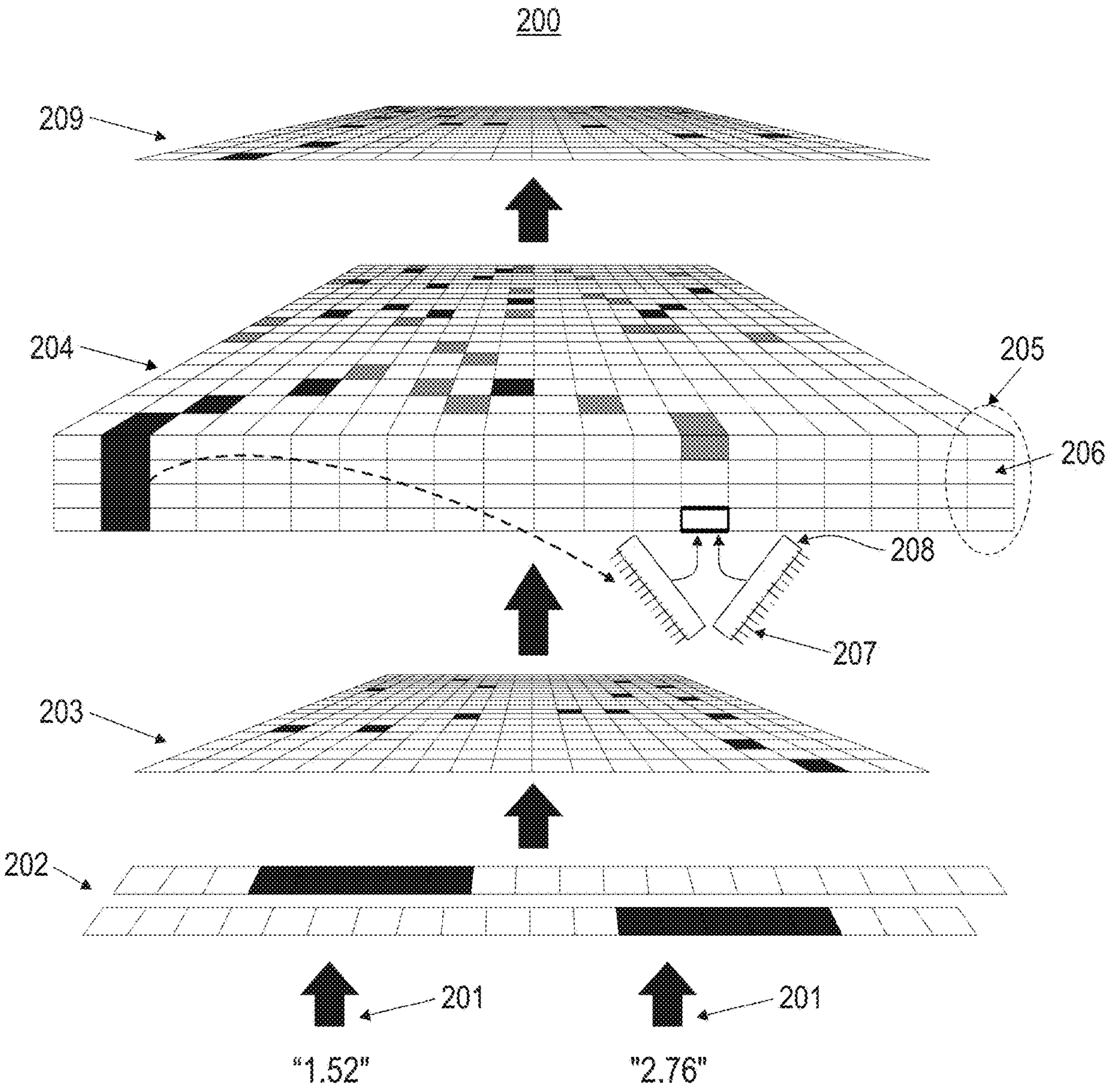
FIG. 2 depicts an exemplary hierarchical temporal memory node according to embodiments of the present disclosure.

With reference now to FIG. 2, an exemplary hierarchical temporal memory node 200 is depicted. Memory 204 includes columns 205, each containing cells 206. Each cell is potentially laterally connected by a plurality of synapses 207 aggregated through segments 208. Each HTM region consists of a number of interconnected columns. In some embodiments, cortical columns tend to inhibit neighboring columns, thus creating a sparse activation of columns. A cortical column is understood as a group of cells that have the same receptive field. Each column has a number of cells that are able to remember several previous states. A cell can be in one of three states: active, inactive and predictive.

When a cell becomes active, it gradually forms connections to nearby cells that tend to be active during several previous time steps. Thus, a cell learns to recognize a known sequence by checking whether the connected cells are active. If a large number of connected cells are active, this cell switches to the predictive state in anticipation of one of the few next inputs of the sequence. If a subsequent input does activate the column of the predicted cell, then the prediction is verified and the cell fires. The active state is communicated via its axon to the next higher region in the hierarchy.

Cortical learning algorithms are able to learn continuously from each new input pattern. During inference, HTM tries to match a stream of inputs to fragments of previously learned sequences. This allows each HTM region to be constantly predicting the likely continuation of the recognized sequences. The set of correctly predicted cells (verified cells) is the output of the region and contributes to the input of the next, higher region. The upper region correlates two or more of its successive inputs, leading to increasing temporal stability of the output in higher hierarchy levels. Prediction also helps to fill in missing patterns in the sequence and to interpret ambiguous data by biasing the system to infer what it predicted.

During training, a node 200 receives a temporal sequence of spatial patterns as its input. Input data 201 from one or more sources are encoded into input neurons. In particular, input data correspond to active neurons 202, whose axons feed into the synapse array of a spatial correlator 203. The spatial correlator generates an SDR of constant sparsity that is fed into memory 204. A temporal correlator generates invariant representations (SDR) 209 of each recognized sequence. Once trained, the temporal memory can predict the next SDR in the sequence given the current SDR. Each cell is predicted by lateral synaptic excitation from other cells, aggregated through segments.

Accordingly, in Hierarchical Temporal Memory (HTM) systems, training data comprising temporal sequences and/or spatial patterns are presented to a network of nodes. The HTM network then builds a model of the statistical structure inherent to the spatial patterns and temporal sequences in the training data, and thereby learns the underlying causes of the temporal sequences of patterns and sequences in the training data. The hierarchical structures of the HTM system allow them to build models of very high dimensional input spaces using reasonable amounts of memory and processing capacity.

The training process of an HTM system generally comprises a form of unsupervised machine learning. During a training process, one or more processing nodes of the HTM system form relationships between temporal sequences and/or spatial patterns present in training input and their associated causes or events. During the learning process, representations indicative of the cause or events corresponding to the training input may be presented to the HTM system to allow the HTM system to associate particular categories, causes or events with the training input.

Once an HTM system has built a model of a particular input space, it can perform inference or prediction. To perform inference or prediction, novel input including temporal sequences or spatial patterns are presented to the HTM system. During the inference stage, each node in the HTM system produces an output that is more invariant and temporally stable than its input. That is, the output from a node in the HTM system is more abstract and invariant compared to its input. At its highest node, the HTM system will generate an output indicative of the underlying cause or event associated with the novel input.

Some HTM nodes may include both a correlator and a sequence memory. A spatial correlator pools its inputs by concatenation and converts sequences of that data into sequences of sparse distributed representations (SDRs), or a long binary vector in which most of the bits are 0 and only a few are 1. This SDR is then used to activate the "columns" of a sequence memory.

Some HTM nodes may include a temporal correlator for learning and storing temporal sequences of spatial patterns in an input signal. A temporal correlator pools its inputs by union (logical OR) and also generates SDRs that may be used to activate the columns of a sequence memory. The processing node may learn and store relationships between spatial patterns or temporal sequences of spatial patterns. The learning and storing of relationships or temporal sequences are performed autonomously in a manner that is robust against noise in the input signal. Based on the stored relationships, the processing node may process a subsequent input signal and generate an output that may represent prediction, identity of sequences of spatial patterns or other useful information.

The processing node includes a sequence processor receiving and processing the signal from the correlator to learn, recognize and predict temporal sequences in the input signal. The sequence processor includes one or more columns, each column including one or more cells. A subset of columns may be selected by the correlator signal, causing one or more cells in these columns to activate. When a cell activates, activation states of some other cells in the same node and/or level are detected and stored. By collectively storing the cell activation states in different cells, the sequence processor may store temporal sequences in the input signal.

Each cell includes one or more dendritic segments. Different dendritic segments in the cell store, in their synapses, different combinations of cell activation states at different times, or points within a learned sequence. The sequence processor may predict a cell when the activation states of other cells correspond to cell activation states stored in a dendritic segment of the cell.

The learning rules used in HTM are Hebbian. In Hebbian networks, all synapses are directional, connecting an axon of the transmitting neuron to a dendrite of the receiving neuron. These are also frequently called the pre-synaptic and post-synaptic neurons respectively. Hebbian learning rules dictate how synapses make and, sometimes, break connections. If the pre-synaptic neuron fires immediately before the post-synaptic neuron, the synapse strengthens, or is created if the proximity of axon to dendrite permits. If the post-synaptic neuron fires without activity in the pre-synaptic neuron, the synapse weakens. If the pre-synaptic neuron fires, but the post-synaptic one does not, the synapse is weakened. The pre-synaptic neuron may thus be considered (at least partially) the cause of the post-synaptic activity. By this mechanism, a succession of causally related firings creates a strong connection between the pair of neurons. The synapse thus provides a memory of that particular firing pattern.

In biological brains, there are many billions of neurons interconnected via synapses to as many as ten thousand other neurons. Human brains are estimated to have 86 billion neurons and more than $10^{14}$ synapses.

As outlined above, an HTM implementing Hebbian learning can be successful in identifying patterns in incoming data-stream(s), identifying recurring features and correlations in those data, and learning sequences. However, the application of Hebbian learning rules tends to grow the network without limit, consuming computational resources for elements that may have been observed occasionally but are no longer needed. Other patterns may occur very frequently, leading to instabilities in the network. For example, such networks may be prone to overlearning, where several synapses are strengthened so much that new patterns cannot be learned. Such networks may also be prone to oscillation where alternating input patterns compete to strengthen and weaken the same synapses.

The present disclosure provides for networks that tend towards an equilibrium between new synapse formation (synaptogenesis) and active removal (pruning) of unnecessary synapses. This balance is akin to biological homeostasis—the tendency toward a relatively stable equilibrium between interdependent elements, especially as maintained by physiological processes. Such mechanisms operate in the human brain to regulate the metabolism and to stabilize many neural processes.

Figure 3:
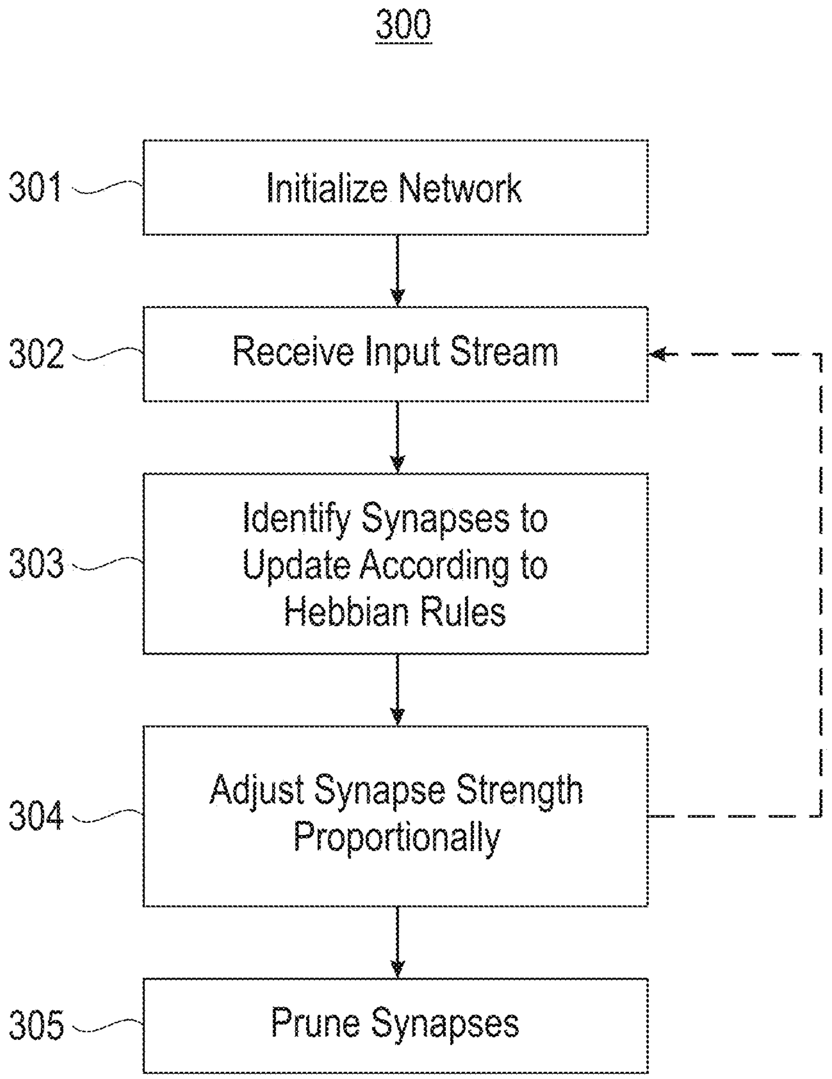
FIG. 3 illustrates a method of operating an artificial neural network according to embodiments of the present disclosure.

Referring now to FIG. 3, a method of operating an artificial neural network is illustrated according to embodiments of the present disclosure. In various embodiments, the artificial neural network includes one or more regions. Each region has a plurality of neurons and synapses therein. Each region correlates its input data-streams with each other and learns sequences embedded in the input data-streams.

At 301, the artificial neural network is initialized. In each region, a plurality of synapses are connected. In some embodiments, this initial connection is sparse. In some embodiments, sparse connections correspond to about 2% or fewer of the possible connections between pairs of neurons with a region. In some embodiments, sparse connection corresponds to about 0.005% or fewer of the possible connections.

In some embodiments, the initial sparse connection is determined by the number of bits expected to be active on an input vector. In particular, the initial connectivity is sufficient to provide matching, but not so extensive as to get accidental matches or to use up too many resources. Thus, initial connectivity is inversely proportional to the number of bits expected to be on, thereby reducing the probability of accidental overlap.

At 302, an input stream is received by the network. Neurons are activated according to the correspondence between the input and connected synapses. At 303, synapses of the network to be strengthened or weakened according to Hebbian learning are identified. In particular, if the pre-synaptic neuron fires immediately before the post-synaptic neuron, the synapse is a candidate to strengthen, or to be created if the proximity of axon to dendrite permits. If the post-synaptic neuron fires without activity in the pre-synaptic neuron, the synapse is a candidate to weaken. If the pre-synaptic neuron fires, but the post-synaptic one does not, the synapse is a candidate to weaken. The process is repeated as new input is received.

At 304, synaptic strengths of the candidate synapses are adjusted based on the number of synapses being updated on a given axon and/or dendrite. In particular, the synaptic strengths are increased or decreased by an amount inversely proportional to the number of synapses being updated on each axon or dendrite.

At 305, the synapses may be pruned. In some embodiments, the weakest synapses are removed where the number of synapses on a given axon exceeds a predetermined threshold. In some embodiments, the weakest synapses are removed where the number of synapses on a given dendrite exceeds a predetermined threshold.

In various embodiments, Hebbian strengthening at step 304 may be suppressed for synapses on axons and/or dendrites having greater than a predetermined number of connected synapses. Similarly, Hebbian weakening at step 304 may be suppressed for synapses on axons and/or dendrites having less than a predetermined number of connected synapses.

In various embodiments, Hebbian strengthening at step 304 may be scaled based on the degree to which the number of connected synapses on the axon and/or dendrite of the updated synapse differs from a predetermined limit. It will be appreciated that a variety of scaling functions may be applied to scale synaptic strengthening or weakening. For example, the adjustment to synaptic strength may vary linearly based on the number of connected synapses. In another example, various non-linear functions may be applied, such that synapses adjustments decrease as the number of connected synapses increases.

The present disclosure provides for regulating an ANN, allowing it to grow by making new synapses as it learns while providing mechanisms to control and limit that growth. As a result, the neural network code runs faster, and thus consumes less power, and generates less heat. Computer resources that are no longer needed are made available for more extensive future learning tasks. In addition, the tendency for a network to over-learn is eliminated or greatly reduced.

As described above, computational systems for continuous, unsupervised learning are adapted to receive data from disparate, multimodal sources, correlate the inputs, identify and learn temporal sequences, and thereby become able to predict future input values. Artificial neural networks (ANNs) provide a general framework for such systems. As described above, the present disclosure relates to ANNs that emulate the function of the mammalian brain. For example, the present disclosure is applicable to HTMs having cortical regions that operate using common algorithms. Cortical regions connect to each other in a hierarchy with lower regions feeding data forward to upper regions and receiving feedback from them. Each region thus receives different data and performs different functions, although the algorithms are the same. In addition, the cortex can communicate with other non-cortical and sub-cortical regions in order to accomplish additional tasks including long-term memorization, achievement of goals, and motor control.

In an exemplary ANN, each cortical region consists of correlator, sequence memory, and feedback processor. The correlator receives, and merges (pools) several encoded data-streams fed-forward from other regions lower in the hierarchy. The correlations correspond to commonly occurring patterns. The sequence memory learns the temporal sequences of these patterns and then, based on the context of recent prior input, makes predictions about what will come next. Feedback from regions higher in the network are used to overcome gaps or noise in the feed-forward data and to override, perhaps temporarily, the neural response to the questionable data.

The concept of permanence signifies the likelihood that each synapse forms a connection between an axon from a pre-synaptic neuron and a dendrite of the post-synaptic neuron. Connected synapses thus relay information from pre- to post-synaptic neurons. In a binary network, the weight of each synapse is either zero or one, connected or not. The synapse is connected if its permanence exceeds a certain threshold value. In the mathematical description of the synapse arrays, it is convenient to think of each synapse as an element in a sparse matrix.

The columns of the matrix correspond to the axons from each pre-synaptic neuron, the rows to the dendrites of each post-synaptic neuron. Each post-synaptic neuron may have several dendritic segments, each assigned to its own row. In various embodiments, there are two matrices with this structure. The first matrix contains elements giving the permanence of the synapse indexed by row and column as a real number, typically between 0 and 1. The second matrix gives the connectivity or weight, which may be a binary value.

As compared to Hebbian learning rules as described above, embodiments of the present disclosure exhibit increased network stability. In particular, various embodiments employ very sparse network initialization, homeostatic learning, and pruning of the least relevant synapses. These modifications require no additional parameters that need to be set by the user. Rather, they are derived from other properties and metrics of the network. In particular, the number of axons and the number of dendrite segments and the fraction of each which are expected to be active are set at the time the network is designed.

Initialization is made with just a small number of connected synapses. The correlator may be initialized with a small number of connections, while the sequence memory may be initialized with zero.

In some embodiments, a floating threshold may be used to determine the number of active synapses required to induce post-synaptic firing. Various embodiments of a floating threshold are described in U.S. application Ser. No. 15/685,152, filed on Aug. 24, 2017, which is hereby incorporated by reference. A small initial activation threshold leads rapidly to the creation of many new and meaningful synapses that relate directly to the incoming data.

Because of the learning dynamics and the relative compactness of the binary correlator, it is preferable to initialize each instance of it with a small number of connected synapses. The optimum number of synapses initially connected in the binary correlator is calculated from another property of the network region, the expected number of active input bits. If the input binary vector has $N_{on}$ active bits (in binary state 1), then the statistics of coincidence (overlap) dictate that a fraction of order $f=1/N_{on}$ of the synapses should connected in order to minimize the response to randomly overlapping bits and the total number of synapses with non-zero permanence. This in turn dictates how much memory is required and the CPU time necessary for processing. If the post-synaptic activity is less than the pre-synaptic, with $N_{act}$ neurons expected to be active, then the fraction to connect is $f=1/N_{act}$. In various embodiments, the largest of these two values is selected in order to achieve the highest efficiency with the least error rate.

Having determined how many synapses to connect initially, they are then connected. In various embodiments, they may be connected at random. In other embodiments, a non-random distribution is used. Each dendrite has the same number of synapses, namely $f \times N_{axon}$, where $N_{axon}$ is the number of axons. In some embodiments, this number of non-zero synapses is distributed at random along each row of the matrix, with half of them being above the permanence threshold, and therefore connected, and half below. In this way, permanence and connectivity matrices suitable to seed the learning process in the correlator are initialized.

In sequence memory, synapses are created when a post-synaptic neuron fires soon after a pre-synaptic neuron. The HTM provides a mechanism for post-synaptic activity in a new sequence memory. It is therefore not necessary to create any during network initialization. This approach minimizes memory requirements and processing time.

Learning in the correlator and sequence memory proceeds according to Hebbian rules. New synapses are formed, or the permanence is increased when an axonal (pre-synaptic) neuron that fires immediately before the dendritic (post-synaptic) neuron is increased. When either the pre- or post-synaptic neurons fire alone, the permanence of that synapse is decreased. According to the present disclosure, a large degree of homeostasis is achieved by ensuring that the ratio of permanence increment to permanence decrement on each dendrite (or dendritic segment) is in inverse proportion to the number of synapses being incremented and decremented, thus tending to maintain an overall average permanence.

In some circumstances, homeostasis is not completely achieved by proportional synaptic updates due to the addition of new synapses and due to the upper limit imposed on permanence. Accordingly, in various embodiments, the Hebbian rules are adjusted to account for axons and dendrites that have either many fewer than the average number of connected synapses or many more. If the axon and/or dendrite has an excess of connected synapses, the increase in permanence is decreased. Similarly, if an axon or dendrite has a lack of connected synapses, the magnitude of the permanence decrement is decreased. In addition, excess synapses can be reduced by increasing the decrement and a deficit of synapses can be improved by increasing the increment. Adopting this approach, if the excess is too high, no synaptic increments are made on that dendrite or axon. If the deficit is too much, no decrements are made.

As described above, the connectivity of the synapse array is bounded both from below and from above. In some embodiments, synapses with permanence below the threshold value are efficiently removed. In some such embodiments, an upper limit is imposed on the total number of synapses per dendritic segment, both connected and unconnected. Pruning (e.g., by setting the permanence to zero) is used to remove synapses in excess of this number. Synapses with the lowest permanence are removed. In some embodiments, the maximum for the number of synapses is a small multiple of the expected activity (number of active cells) in the network region. The behavior of the system is not very sensitive to the choice of this number.

In various embodiments, the network is configured to have as many neurons as possible fire at least some of the time. One approach is to keep track of the firing frequency, for example, in an auxiliary active-duty-factor variable keeping a running average over a user-determined averaging time. Since firing occurs when the overlap of connected synapses in the dendrite with active axons reaches a threshold value, neurons with a low active-duty-factor have their overlap boosted.

Embodiments of the present disclosure provide for more efficient methods to achieve desirable firing frequency without additional parameters or variables. In such embodiments, the number of connected synapses on each dendrite is itself used as a record of neural activity. The overlap of the dendrite is multiplied by factor proportional to $N_{on}/(1+N_{Conn})$ where $N_{on}$ is the number of active axons, and $N_{Conn}$ is the number of connected synapses on the dendrite. The behavior of the network is insensitive to the value of the proportionality factor; in various embodiments, both 1 and 2 achieve acceptable results.

The performance of an exemplary binary neural network, consisting of a single region, was evaluated using various combinations of the features described above. The input data consisted of two time series—sinusoidal oscillations with frequencies in the ratio of 1:3. This synthetic data set provides a severe test of the binary correlator component of the region, because each input has several turning points where successive values change little in each time-step. Thus, there are highly repetitive sections of the input data which tend to over-learning in a poorly designed network.

The two analog input signals were encoded as sparse binary vectors using simple positioning of the active bits in a slide-bar encoding. The two vectors were concatenated (pooled) and fed into the input (axons) of the correlator. The resulting output is another binary vector that evolves as the network learns. This output was in turn fed into sequence memory, which started to predict its next input. The quality of prediction is measured by comparing the predicted binary vector with the actual next input, using the Jaccard similarity index, the ratio of vector intersection to union.

A symptom of over-learning in the correlator is having too many connections on several dendrites, and too few or even none on others. This leads to an inability to reconstruct accurately its input from its output. Reconstruction is the reverse process of the normal feed-forward of data through the network. Reconstruction is used to decode the binary prediction, but may also be used to compare reconstructed correlator output with actual input in order to assess over-learning. The binary vector comparison was made via Jaccard similarity.

The reconstructed input and predicted vectors are decoded to yield analog values that can be compared with the original data-stream by calculating root-mean-square errors. In this example, the homeostatic principles are as follows. Initialize a fraction of the synapses with equal numbers on each dendrite. Do not increase permanence of synapses on active dendrites with more than set maximum number of connections. Do not decrease permanence of synapses on inactive dendrites with fewer than the set minimum number of connections. Do not increase permanence of synapses on active axons with more than set maximum number of connections. Do not decrease permanence of synapses on inactive axons with fewer than set minimum number of connections.

The results of the above example are summarized in Table 1. In Table 1, $c_D(a)$ and $c_D(i)$ are the number of connections on active and inactive dendrites a and i; $c_A(a)$ and $c_A(i)$ are the number of connections on active/inactive axon a and i. The arrows indicate the trend in the metric (falling or rising) at the end of 36,000 iterations, at which point the run was terminated.

TABLE 1

| Feature | Max. dend. Conn. | Max, axon Conn. | Recon. Jaccard | Recon. RMSE Ch-1 | Recon. RMSE Ch-2 | Pred. Jaccard | Pred. RMSE Ch-1 | Pred. RMSE Ch-2 |
|---|---|---|---|---|---|---|---|---|
| Baseline | 30 | 80 | — | 0.15 | 0.25 | 0.7 ↓ | 0.25 | 0.30 |
| No increase if $c_D(a) > N_{on}$ | 22 | 70 | — | 0.12 | 0.15 | 0.7 ↓ | 0.20 | 0.22 |
| Initialize 5% dendrites equally. ½ connected. | 22 | 80 | — | 0.15 | 0.15 | 0.7 ↓ | 0.22 | 0.25 |
| Initialize 2.5% dendrites equally. ½ connected. | 22 | 65 | — | 0.2 | 0.15 | 0.7 → | 0.25 | 0.25 |
| No increase if $c_D(a) > N_{on}/2$ | 12 | 40 | | 0.08 | 0.06 | 0.7 ↑ | 0.17 | 0.15 |
| No decrease if $c_D(a) < \text{min.}$ | 11 | 37 | 0.35 ↓ | 0.06 | 0.10 | 0.71 ↑ | 0.15 | 0.15 |
| Reconstruct by overlap and threshold | 11 | 40 | 0.74 ↑ | 0.02 | 0.01 | 0.74 ↑ | 0.03 | 0.10 |
| No increase if $c_A(a). > \text{max.}$ | 11 | 17 | 0.80 | 0.01 | 0.01 | 0.72 ↑ | 0.06 | 0.15 |
| No decrease if $c_A(i). < \text{min}$ | 11 | 17 | 0.81 ↑ | 0.01 | 0.01 | 0.72 ↑ | 0.05 | 0.12 |

TABLE 1-continued

| Feature | Max. dend. Conn. | Max, axon Conn. | Recon. Jaccard | Recon. RMSE Ch-1 | Recon. RMSE Ch-2 | Pred. Jaccard | Pred. RMSE Ch-1 | Pred. RMSE Ch-2 |
|---|---|---|---|---|---|---|---|---|
| No decrease if $c_D(i)$. < min. | 11 | 17 | 0.82 ↑ | 0.01 | 0.01 | 0.72 ↑ | 0.04 | 0.08 |

The above results indicate that initializing a small number of synapses does not prohibit learning. Prohibiting Hebbian increases on both dendrites and axons with excess connected synapses improves the network's ability to reconstruct, without affecting its ability to learn. Prohibiting Hebbian decreases on both dendrites and axons with too few synapses improves the network's ability to reconstruct, without affecting its ability to learn. Input reconstruction accuracy reaches the digitization limit of root-mean-square error (RMSE) 0.01. The failure of the prediction accuracy to reach this limit can be attributed to errors in sequence memory.

These results show that the homeostatic networks described herein perform at least as well as alternative algorithms, do not continue to grow indefinitely, and run faster with stable CPU time per-iteration.

Figure 4:
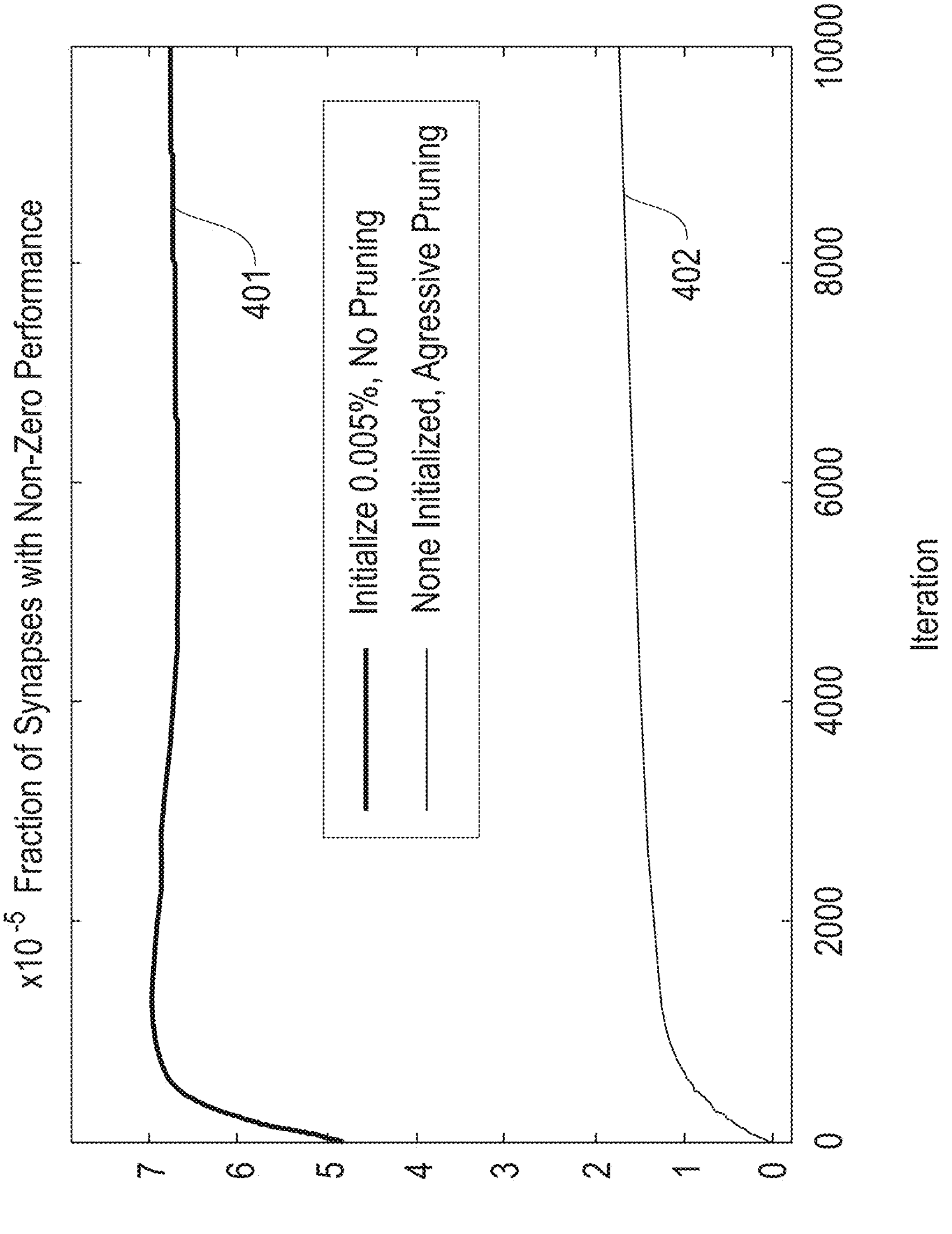
FIG. 4 illustrates the permanence of synapses in sequence memory according to embodiments of the present disclosure.
Figure 5:
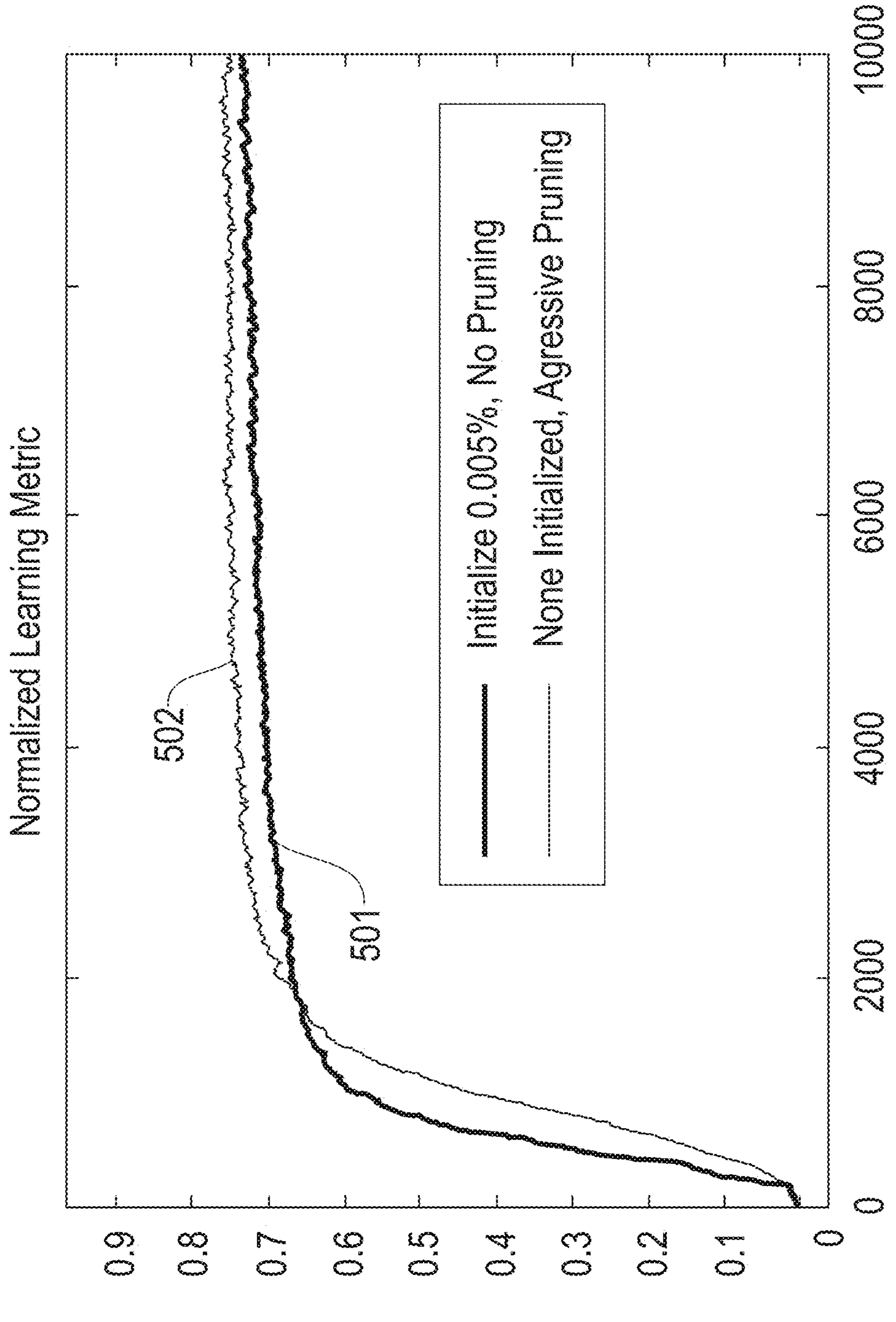
FIG. 5 illustrates a learning metric of systems according to embodiments of the present disclosure.

Referring now to FIGS. 4-5, the performance of an exemplary network according to the present disclosure is illustrated. In this example, the network consists of a single region with 1024 columns, 64 cells per column, and 4 dendritic segments per cell. The input data comprise a sequence of 200 random numbers, repeated for 50 epochs, giving 10,000 total iterations.

FIG. 4 shows the fraction of synapses in sequence memory which have non-zero permanence and therefore are potentially updated at every iteration. The upper line 401 shows the behavior of the network when a fraction of the potential synapses are initialized with non-zero permanence, and none is pruned. Lower line 402 illustrates the behavior of the network when no potential synapses are initialized and aggressive pruning is performed. The number of synapses rises smoothly and stabilizes quickly at about ⅕ of the first case.

FIG. 5, shows a normalized learning metric, the Jaccard similarity of predicted value of the next input to that actually observed, for the same two conditions. After lagging initially, the uninitialized, pruned system (line 502) shows better learning than the system with initialization and no pruning (line 501). In addition, for the uninitialized, pruned system the running time is reduced by about 12% due to the smaller number of synapses to be updated. Pruning may be done less aggressively (for example, not in every iteration) with further speed up in execution and no significant loss in accuracy.

Figure 6:
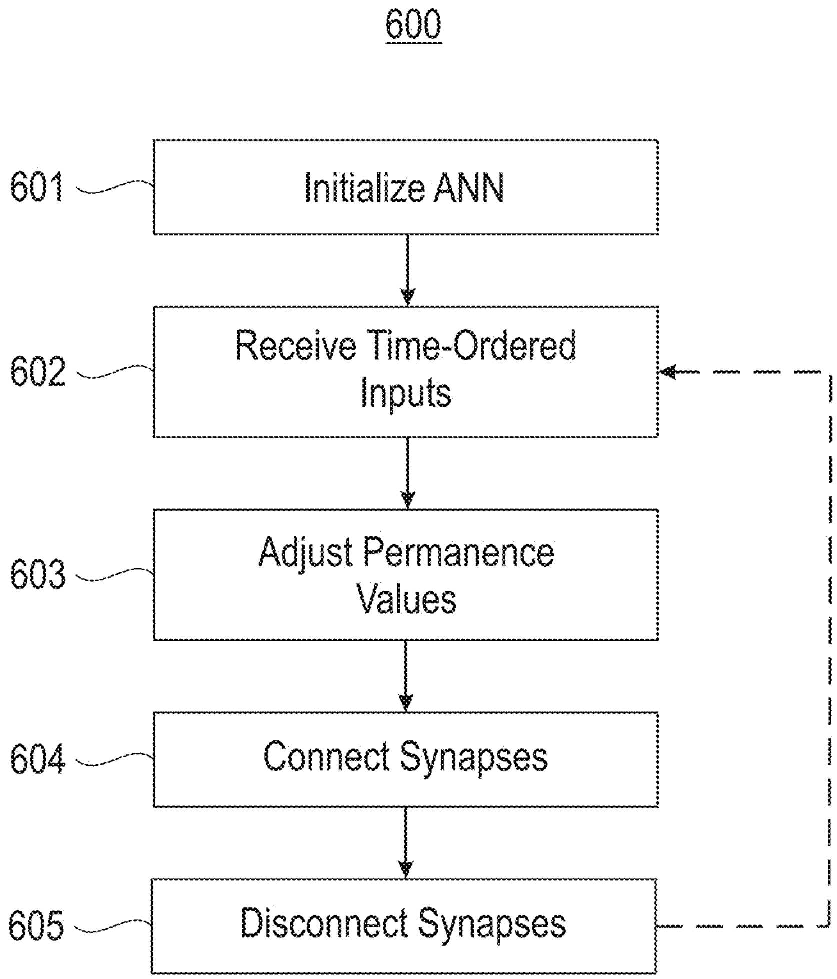
FIG. 6 illustrates a method of operating an artificial neural network according to embodiments of the present disclosure.

Referring now to FIG. 6, a method of operating an artificial neural network is illustrated according to embodiments of the present disclosure. At 601, a region of an artificial neural network is initialized. The region comprises a plurality of neurons and has a permanence value associated with each potential synaptic connection between neurons. The initialization comprises connecting a subset of the potential synaptic connections by synapses. At 602, a plurality of time-ordered inputs to the region is received. Some of the plurality of neurons are thereby caused to fire upon receipt of each time-ordered input. At 603, upon receipt of each time-ordered input, for each potential synaptic connection between neurons, the permanence value is adjusted according to a firing sequence of the plurality of neurons. At 604, those potential synaptic connections having a permanence value above a predetermined permanence threshold are connected when a total number of connected synapses in the region does not exceed a predetermined connectivity threshold. At 605, synapses whose associated pre-synaptic neuron or post-synaptic neuron have more than a predetermined number of connected synapses are disconnected.

Figure 7:
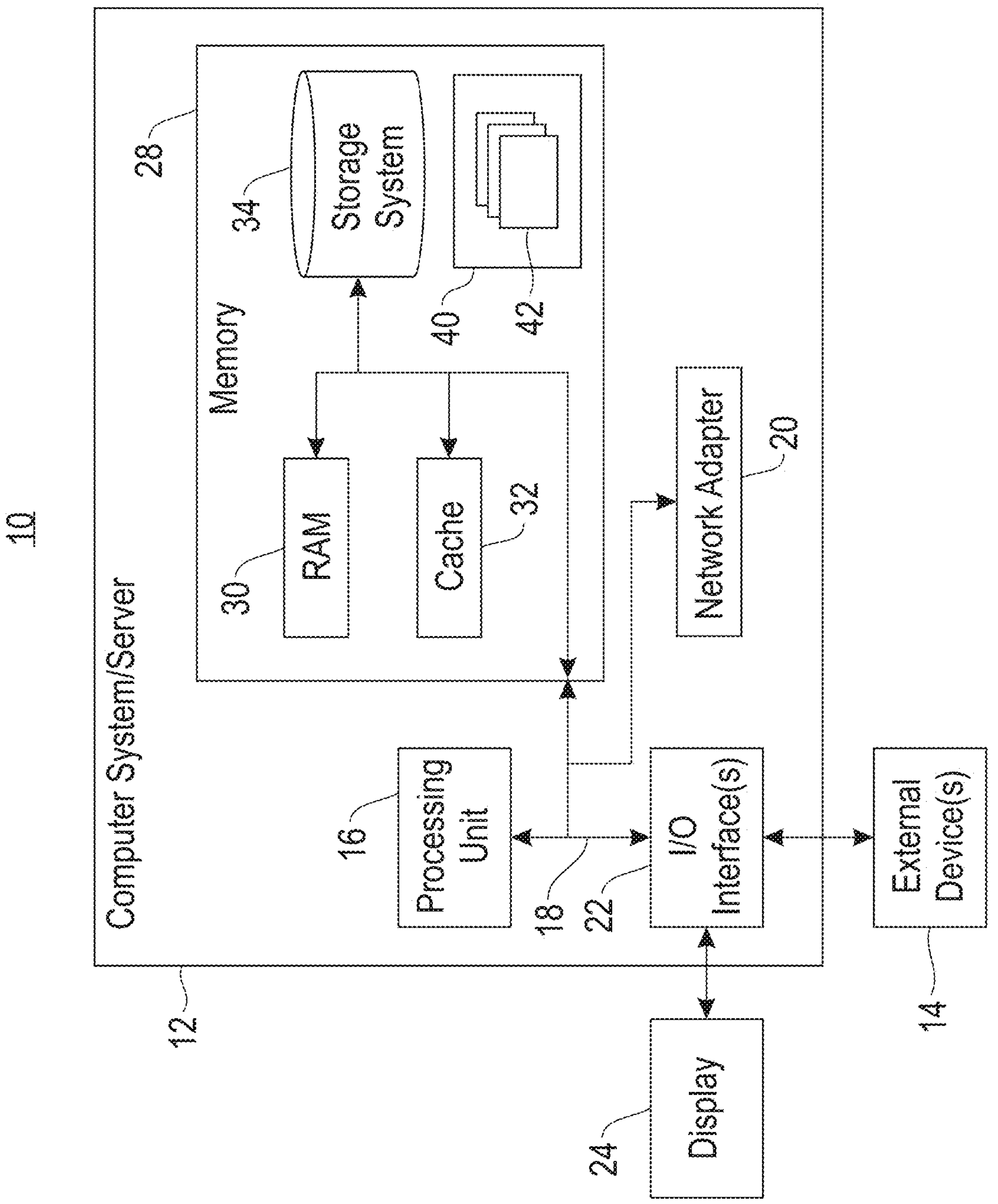
FIG. 7 depicts a computing node according to an embodiment of the present invention.

Referring now to FIG. 7, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

initializing a region of an artificial neural network, the region comprising a plurality of neurons and having a permanence value associated with each potential synaptic connection between neurons, said initializing comprising connecting a subset of the potential synaptic connections to form synapses;

receiving a plurality of time-ordered inputs to the region, thereby causing some of the plurality of neurons to fire upon receipt of each time-ordered input; and upon receipt of each time-ordered input, for each potential synaptic connection between neurons:

(i) adjusting the permanence value according to a firing sequence of the plurality of neurons;

(ii) connecting those potential synaptic connections having a permanence value above a predetermined permanence threshold when the total number of connected synapses in the region does not exceed a predetermined connectivity threshold; and (iii) disconnecting synapses whose associated pre-synaptic neuron and/or post-synaptic neuron have more than a predetermined number of connected synapses.

2. The method of claim 1, wherein adjusting the permanence value comprises:

for a potential synaptic connection having a pre-synaptic neuron and a post-synaptic neuron, increasing the potential synaptic connection's permanence value when the post-synaptic neuron fires, provided that the pre-synaptic neuron fired upon receipt of an immediately prior time-ordered input;

decreasing the potential synaptic connection's permanence value when the post-synaptic neuron fires, provided that the pre-synaptic neuron did not fire upon receipt of the immediately prior time-ordered input; and decreasing the potential synaptic connection's permanence value when the post-synaptic neuron doesn't fire, provided that the pre-synaptic neuron did not fire upon receipt of the immediately prior time-ordered input.

3. The method of claim 2, wherein the increasing is inversely proportional to the potential synaptic connection's permanence value.

4. The method of claim 2, wherein each decreasing is proportional to the potential synaptic connection's permanence value.

5. The method of claim 2, wherein the increasing is inversely proportional to a number of synapses connected to the pre-synaptic neuron or to the post-synaptic neuron.

6. The method of claim 1, wherein the subset is two percent or less of the potential synaptic connections.

7. The method of claim 1, wherein the subset is 0.005 percent or less of the potential synaptic connections.

8. The method of claim 1, wherein the initializing results in sparse connectivity of the plurality of neurons.

9. The method of claim 1, wherein each of the plurality of time-ordered inputs is a sparse representation.

10. The method of claim 1, further comprising:

disconnecting those potential synaptic connections having a permanence value below a predetermined permanence threshold.

11. The method of claim 1, wherein the region comprises a correlator and a sequence memory.

12. The method of claim 1, wherein said disconnecting synapses comprises disconnecting synapses having a least permanence value.

13. A system comprising:

a computing node comprising a computer readable storage medium having program instructions embodied therewith, the program instructions executable by a processor of the computing node to cause the processor to perform a method comprising:

initializing a region of an artificial neural network, the region comprising a plurality of neurons and having a permanence value associated with each potential synaptic connection between neurons, said initializing comprising connecting a subset of the potential synaptic connections by synapses;

receiving a plurality of time-ordered inputs to the region, thereby causing some of the plurality of neurons to fire upon receipt of each time-ordered input; and upon receipt of each time-ordered input, for each potential synaptic connection between neurons, (i) adjusting the permanence value according to a firing sequence of the plurality of neurons;

(ii) connecting those potential synaptic connections having a permanence value above a predetermined permanence threshold when the total number of connected synapses in the region does not exceed a predetermined connectivity threshold; and (iii) disconnecting synapses whose associated pre-synaptic neuron and/or post-synaptic neuron have more than a predetermined number of connected synapses.

14. A computer program product for operating a neural network, the computer program product comprising a computer readable storage medium having program instructions embodied therewith, the program instructions executable by a processor to cause the processor to perform a method comprising:

initializing a region of an artificial neural network, the region comprising a plurality of neurons and having a permanence value associated with each potential synaptic connection between neurons, said initializing comprising connecting a subset of the potential synaptic connections by synapses;

receiving a plurality of time-ordered inputs to the region, thereby causing some of the plurality of neurons to fire upon receipt of each time-ordered input; and upon receipt of each time-ordered input, for each potential synaptic connection between neurons:

(i) adjusting the permanence value according to a firing sequence of the plurality of neurons;

(ii) connecting those potential synaptic connection having a permanence value above a predetermined permanence threshold when the total number of connected synapses in the region does not exceed a predetermined connectivity threshold; and (iii) disconnecting synapses whose associated pre-synaptic neuron and/or post-synaptic neuron have more than a predetermined number of connected synapses.

15. An artificial neural network comprising a region comprising a plurality of neurons and having a permanence value associated with each potential synaptic connection between neurons, the neural network adapted to:

initialize the region of an artificial neural network by connecting a subset of the potential synaptic connections by synapses;

receive a plurality of time-ordered inputs to the region, thereby causing some of the plurality of neurons to fire upon receipt of each time-ordered input; and upon receipt of each time-ordered input, for each potential synaptic connection between neurons, (i) adjust the permanence value according to a firing sequence of the plurality of neurons;

(ii) connect those potential synaptic connections having a permanence value above a predetermined permanence threshold when the total number of connected synapses in the region does not exceed a predetermined connectivity threshold; and (iii) disconnect synapses whose associated pre-synaptic neuron and/or post-synaptic neuron have more than a predetermined number of connected synapses.

16. The artificial neural network of claim 15, wherein adjusting the permanence value comprises:

for a potential synaptic connection having a pre-synaptic neuron and a post-synaptic neuron, increasing the potential synaptic connection's permanence value when the post-synaptic neuron fires, provided that the pre-synaptic neuron fired upon receipt of an immediately prior time-ordered input;

decreasing the potential synaptic connection's permanence value when the post-synaptic neuron fires, provided that the pre-synaptic neuron did not fire upon receipt of the immediately prior time-ordered input; and decreasing the potential synaptic connection's permanence value when the post-synaptic neuron doesn't fire, provided that the pre-synaptic neuron did not fire upon receipt of the immediately prior time-ordered input.

17. The artificial neural network of claim 16, wherein the increasing is inversely proportional to the potential synaptic connection's permanence value.

18. The artificial neural network of claim 16, wherein each decreasing is proportional to the potential synaptic connection's permanence value.

19. The artificial neural network of claim 16, wherein the increasing is inversely proportional to a number of synapses connected to the pre-synaptic neuron or to the post-synaptic neuron.

20. The artificial neural network of claim 15, wherein the subset is two percent or less of the potential synaptic connections.

21. The artificial neural network of claim 15, wherein the subset is 0.005 percent or less of the potential synaptic connections.

22. The artificial neural network of claim 15, wherein the initializing results in sparse connectivity of the plurality of neurons.

23. The artificial neural network of claim 15, wherein each of the plurality of time-ordered inputs is a sparse representation.

24. The artificial neural network of claim 15, wherein the neural network is further adapted to:

disconnect those potential synaptic connections having a permanence value below a predetermined permanence threshold.

25. The artificial neural network of claim 15, wherein the region comprises a correlator and a sequence memory.

26. The artificial neural network of claim 15, wherein disconnecting synapses comprises disconnecting synapses having a least permanence value.

27. A method comprising:

receiving a plurality of time-ordered inputs to an artificial neural network, thereby causing a plurality of neurons of the artificial neural network to fire upon receipt of each time-ordered input;

upon receipt of each time-ordered input, for each potential synaptic connection between neurons of the artificial neural network: (i) increasing a permanence value associated with each potential synaptic connection between neurons that fire in sequence and (ii) decreasing a permanence value associated with each potential synaptic connection between neurons that do not fire in sequence;

connecting those potential synaptic connections having a permanence value above a predetermined permanence threshold when the total number of connected synapses does not exceed a predetermined connectivity threshold; and disconnecting synaptic connections whose associated neurons have more than a predetermined number of synaptic connections.

* * * * *